United States Patent [19]

Borza

[11] Patent Number: 5,995,630
[45] Date of Patent: *Nov. 30, 1999

[54] BIOMETRIC INPUT WITH ENCRYPTION

[75] Inventor: Michael Andrew Borza, Ottawa, Canada

[73] Assignee: DEW Engineering and Development Limited, Ottawa, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/808,863

[22] Filed: Feb. 28, 1997

Related U.S. Application Data

[63] Continuation-in-part of application No. 08/611,719, Mar. 7, 1996, abandoned.

[51] Int. Cl.$^6$ .............................. G09C 3/00; G06K 9/78; G06F 7/04
[52] U.S. Cl. ................... 380/54; 380/21; 380/23; 382/100; 382/124; 382/116; 382/232; 340/825.3; 340/825.31
[58] Field of Search .................................. 380/23, 21, 25, 380/5, 10, 20, 54; 382/115, 116, 124, 100, 232; 340/825.3, 825.31, 825.34

[56] References Cited

U.S. PATENT DOCUMENTS

| 4,438,824 | 3/1984 | Mueller-Schloer | 178/22.08 |
|---|---|---|---|
| 4,694,489 | 9/1987 | Fredericksen | 380/10 |
| 4,821,118 | 4/1989 | Lafreniere | 358/109 |
| 4,972,476 | 11/1990 | Nathans | 380/23 |
| 4,993,068 | 2/1991 | Piosenka et al. | 380/23 |
| 5,229,764 | 7/1993 | Matchett et al. | 340/825 |
| 5,283,831 | 2/1994 | Cook et al. | 380/48 |
| 5,420,924 | 5/1995 | Berson et al. | 380/23 |
| 5,457,747 | 10/1995 | Drexler et al. | 380/24 |
| 5,471,533 | 11/1995 | Wang et al. | 380/51 |
| 5,495,533 | 2/1996 | Linehan et al. | 380/21 |
| 5,596,454 | 1/1997 | Hebert | 359/726 |
| 5,598,474 | 1/1997 | Johnson | 380/23 |
| 5,619,571 | 4/1997 | Sandstrom et al. | 380/4 |
| 5,680,460 | 10/1997 | Tomko et al. | 380/23 |
| 5,712,912 | 1/1998 | Tomko et al. | 380/23 |
| 5,790,668 | 8/1998 | Tomko | 380/25 |
| 5,799,086 | 8/1998 | Sudia | 380/23 |

FOREIGN PATENT DOCUMENTS

| 03104338 | 1/1991 | Japan . |
|---|---|---|
| 08069250 | 12/1996 | Japan . |

*Primary Examiner*—Pinchus M. Laufer
*Assistant Examiner*—Hrayr A. Sayadian
*Attorney, Agent, or Firm*—Neil Teigelbaum & Associates

[57] ABSTRACT

A fingerprint sensing system for providing data in dependence upon fingerprint information to a computer is disclosed. The system comprises an imaging device for capturing a fingerprint image. The fingerprint image is processed to provide associated data such as a portion of an encryption key. The associated data are secured prior to transmission by encoding into an image frame forming part of a video data signal. The data are encoded at predetermined locations within the image frame instead of image pixel data. The video data signal comprising the associated data are then transmitted to a computer. Upon receipt at the computer the received video data signal is processed to extract the encoded data from the predetermined locations within the image frame.

14 Claims, 14 Drawing Sheets

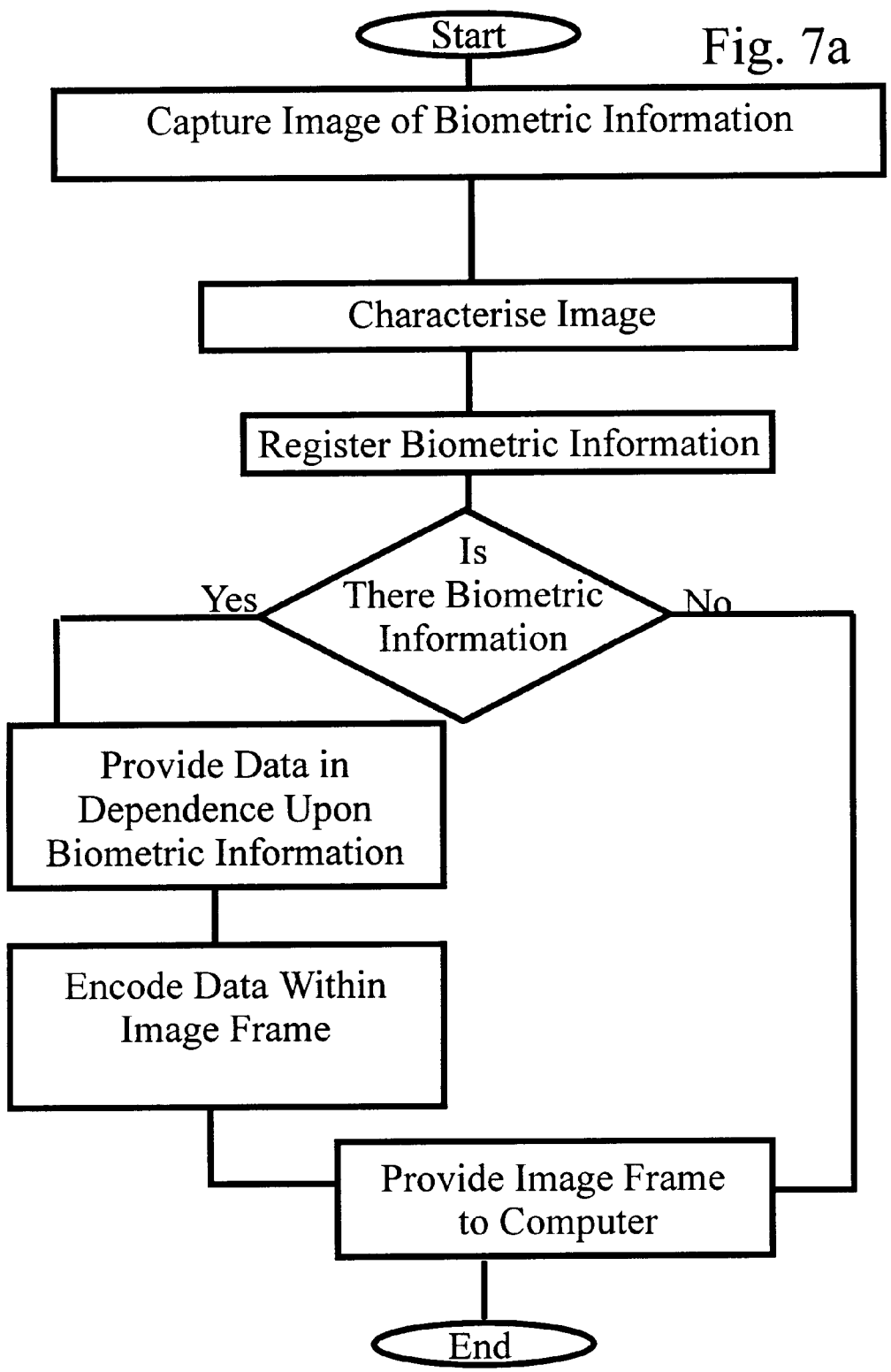

BIOMETRIC INPUT WITH ENCRYPTION

This application is a Continuation-in-Part of application Ser. No. 08/611,719 filed Mar. 7, 1996 now abandoned.

FIELD OF THE INVENTION

This invention relates generally to imaging devices for imaging biometric input for the purpose of user verification. More particularly, the invention relates to contact imaging devices for imaging fingerprints and the like used for encryption and decryption of files.

BACKGROUND OF THE INVENTION

Computer security is fast becoming an important issue. With the proliferation of computers and computer networks into all aspects of business and daily life—financial, medical, education, government, and communications—the concern over secure file access is growing. One method of providing security from unauthorised access to files is encryption and cipher techniques. These techniques take data and convert it into other corresponding data in a fashion that is reversible. Once encrypted, the data is unintelligible unless first decrypted. RSA, DES, PGP, and CAST are known encryption techniques currently believed to provide sufficient security for computer communications and files.

Each of these encryption techniques uses a key or cipher. Such a key is crucial to the encryption/decryption process. Anyone with a correct key, can access information that has previously been encrypted using that key. The entry of the key from the keyboard is impractical since such a key must be remembered by a user for entry and as such is liable to be discovered by an individual desiring access to existing encrypted files.

Further, there is great concern over communication of keys within commercial and governmental offices. It is common for users to inform others of their keys or to transfer their keys to others for use during holidays, sick days, or even as a reminder of the key should the user forget. Also, keys are often written down at the workstation in case a user should forget. Such written passwords undermine the security of many systems.

In DES encryption, the key is a numerical value, for example, 56 bits in length. Such a key can be used to encrypt and subsequently to decrypt data. The security of the data once encrypted is sufficient that the key is required to access the data in an intelligible form. Thus the security of the data is related to the security of the key.

Some encryption systems use keys stored on the same device as the encrypted files. This is akin to storing a lock and its key in the same location. A knowledgeable user gaining access to the device could locate the key and access the data. Other encryption systems use keys stored on portable cards. Such a key is accessed via a password entered at the keyboard. Such a portable card can be taken by other users and the password can be discovered. The portable card is equally subject to transfer between employees and improper storage—at a user's desk.

It would be advantageous to provide a secure, non-transferable authorisation for encryption and decryption of files.

In a fingerprint input transducer or sensor, the finger under investigation is usually pressed against a flat surface, such as a side of a glass plate, and the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Portable fingerprint devices are known in the art. One such device is disclosed in U.S. Pat. No. 5,467,403 and relates to a portable imaging device for capturing fingerprint images and transmitting them to a central location for verification. Such a device is useful in an information gathering and identification process comprising a large central database of fingerprint information. It does not, however, address the current concern for personal privacy with regards to the fingerprint data. Further, such a system can only act to verify identification and thus restrict access from a central location. Communications with the central location are often unsecured.

One problem associated with remote fingerprint sensors concerns transmission of information used for verification. Whereas the fingerprint is unique and cannot be easily duplicated, such is not the case for the electronic representation of the fingerprint. Knowledgeable individuals with incentive to gain access to a system can record such an electronic representation for use at a later time. Further, the signal providing access may be recorded for later use thus circumventing a security system.

It is apparent that a portable-imaging device for providing security and overcoming the aforementioned limitations is desirable.

In the past, optical devices were interfaced with computers through the use of frame grabbers. An optical imaging device such as a video camera or a fingerprint sensor was provided with an opto-electronic component such as a charge coupled device (CCD) capable of transforming optical information in the form of images into electrical signals in the form of analogue output. Often, these signals corresponded to existing standards such as RS170, NTSC or PAL.

One popular use of this technology is in video cameras. A video camera comprises a lens, a CCD, and transformation circuitry. The camera is also provided with recording and playback means. In use, the CCD transforms an image presented to it through the camera lens into an electrical signal. The electrical signal is transformed to correspond with a predetermined analogue video standard and is provided to an output port of the camera. Such an output signal is capable of being displayed on a television or on a security monitor. This output signal is also capable of being displayed or imported into a computer by means of a frame grabber.

Frame grabbers are known and are widely used. A frame grabber is designed to accept an analogue video signal and convert it into a digital representation of a frame or a plurality of frames. Such a device converts a predetermined video signal from an analogue signal to a digital bit map signal through the use of an analogue to digital converter, synchronisation circuitry, grey level recovery circuitry, sequencing and control logic, and an interface to a computer bus. Such frame grabbers are often designed to be coupled with a personal computer and interface with the computer bus in the form of a NUBUS, ISA, PCI, or VLB bus. Typically, these frame grabbers require the opening a PC's protective housing for installation and removal. Further, such frame grabbers are costly.

Electro-optical devices for use as biometric input devices such as fingerprint, retina, or palm scanners are known. In a fingerprint input transducer or sensor, the finger under investigation is usually pressed against a flat surface, such as a side of a glass plate, and the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

The widespread use of personal computers and advances in processor power make them a suitable choice for many applications. Further, the expandability of some personal computers allows for the design and installation of peripherals enhancing functionality or performance. Further yet, the adoption of standard desktop interfaces for computers such as Apple Desktop Bus, RS232, X.25, Ethernet, Parallel, Universal Serial Bus, SCSI, and Appletalk render the design and implementation of desktop peripherals which are removable from a computer and adaptable across different interfaces desirable.

PCMCIA, an organisation comprised of hundreds of manufacturers of memory cards and related peripheral equipment, has established standards for peripheral and memory cards. Such PCMCIA cards enhance the capabilities of a computer by providing a standard hardware interface and standard software protocols. PCMCIA cards have been designed with memory, fax machines, modems, and disk drives. The standard connector size makes them compatible with many portable computers and the PCMCIA standard allows for easy installation and removal of cards. One such PCMCIA card disclosed in U.S. Pat. No. 5,468,952 is a bar code scanning device. Such a device provides convenience in portability as well as use.

The PCMCIA has established spatial standards for circuit boards intended to be used in portable computers. PCMCIA has developed a 68-pin memory card standard for three memory card types.

Type I Memory Cards are the same width and length as a common credit card, about 54 mm×85.6 mm, but are thicker than a credit card. The thickness of a Type I card is 3.3 mm.

Type II Memory Cards are used by those companies which are utilising memory components that are too high to be housed within a Type I card. Type II Memory Cards are also the same overall length and width as credit cards, but have a raised body cross section in the substrate area which gives them an overall thickness of 5 mm. The raised substrate areas of these cards are 48 mm in width.

Type III Memory Cards are the result of a recent movement sponsored by the Small Form Factor Committee to enable 1.8" Small Form Factor Disk Drives to be plugged into memory card connectors. Type III Memory Cards are the same length and width as Type I Memory Cards; however, Type III Memory Cards have a substrate area thickness of 10.5 mm. Also, Type III Memory Cards require card guide opening width of 51 mm on the header connector to accommodate the slightly wider raised substrate area.

OBJECT OF THE INVENTION

Thus, in an attempt to overcome these and other limitations of known prior art devices, it is an object of this invention to provide a device for providing secure encryption and decryption.

It is an object of the invention to provide a device that minimises the unsecured channels used in user verification and securing electronic files.

It is a further object of the invention to provide a contact imaging device that is capable of using a single data path for both image data and security related data.

SUMMARY OF THE INVENTION

In accordance with the invention there is provided a method of providing data, in dependence upon biometric information, to a computer, comprising the steps of:

providing a digital representation of the biometric information;

processing the digital representation of the biometric information to provide data in dependence thereon;

encoding the data within an image frame comprising an array of pixels;

transmitting the image frame to the computer.

In accordance with the invention provides a fingerprint sensing device for providing data in dependence upon biometric information to a computer comprising:

an imaging means for capturing a fingerprint image;

means for processing the fingerprint image to provide associated data;

means for encoding the associated data into an image frame; and, means for providing the image frame comprising the associated data to the computer.

In accordance with the invention provides a fingerprint sensing device for use with a computer comprising:

an imaging means;

electronic non-volatile storage means for storing biometric data; comparison means for comparing data provided by the imaging means and biometric data relating to each of the at least one authorised user; and output means for providing at least an image frame to the computer wherein provision of said image is dependent upon detection of an authorised user.

BRIEF DESCRIPTION OF THE DRAWINGS

Exemplary embodiments of the invention will now be described in conjunction with the following drawings, in which:

FIG. 7a is a simplified flow diagram of a method according to the invention;

DETAILED DESCRIPTION OF THE INVENTION

Figure 1:
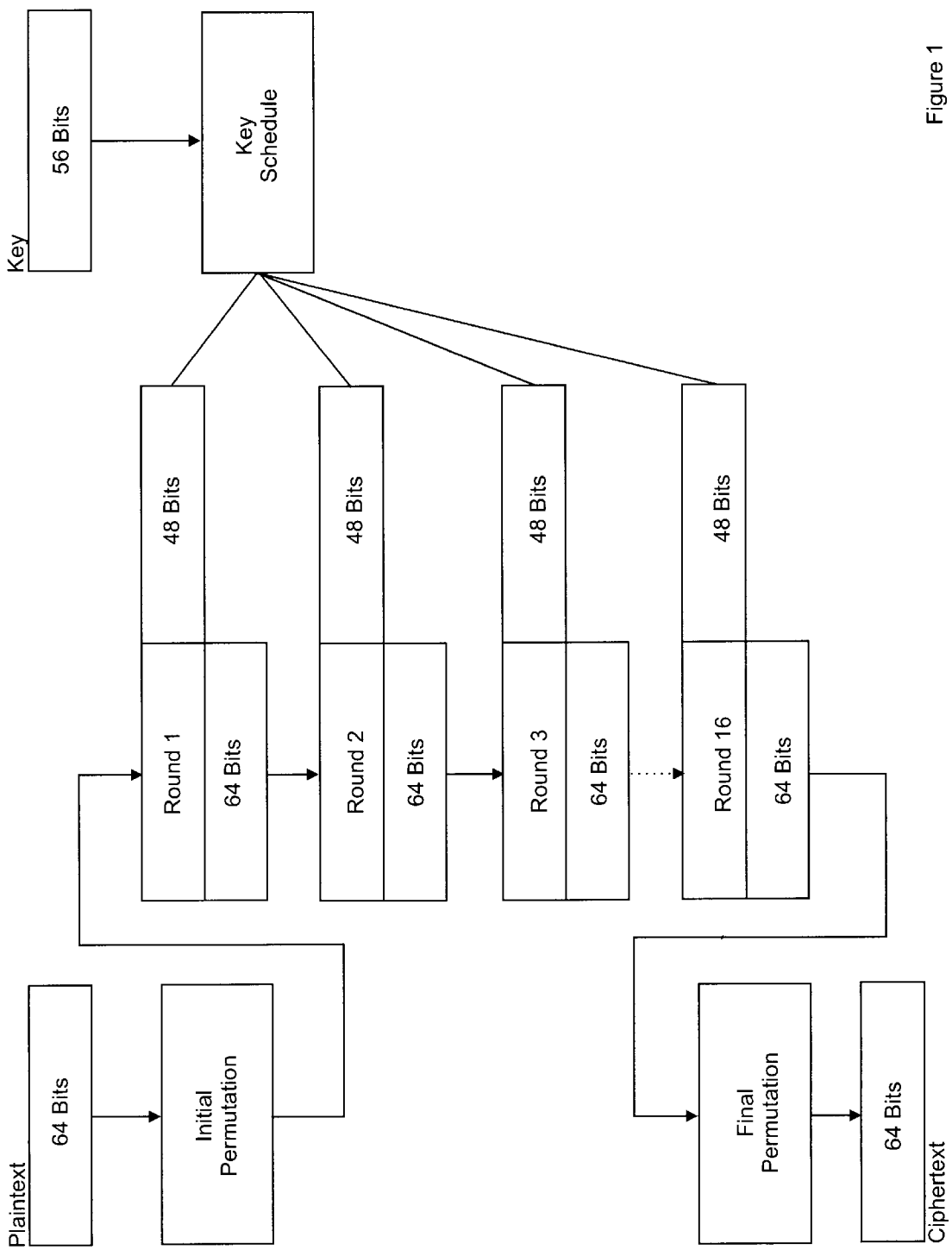
FIG. 1 is a flow chart of DES encryption.

Referring to FIG. 1, a flow chart of DES encryption is presented. DES encryption begins with plain text or accessible information. The plain text is encrypted in segments of for example 64 bits. Each segment is initially arranged and then passed through 16 rounds of encryption. Such encryption is based on a 56-bit key which is used to generate sixteen 48 bit keys, one for each round. Following the 16 rounds of encryption, the resulting 64-bit value is arranged one final time and then stored as encrypted text or ciphertext. Such forms of key based encryption are generally known in the art.

Figure 2A:
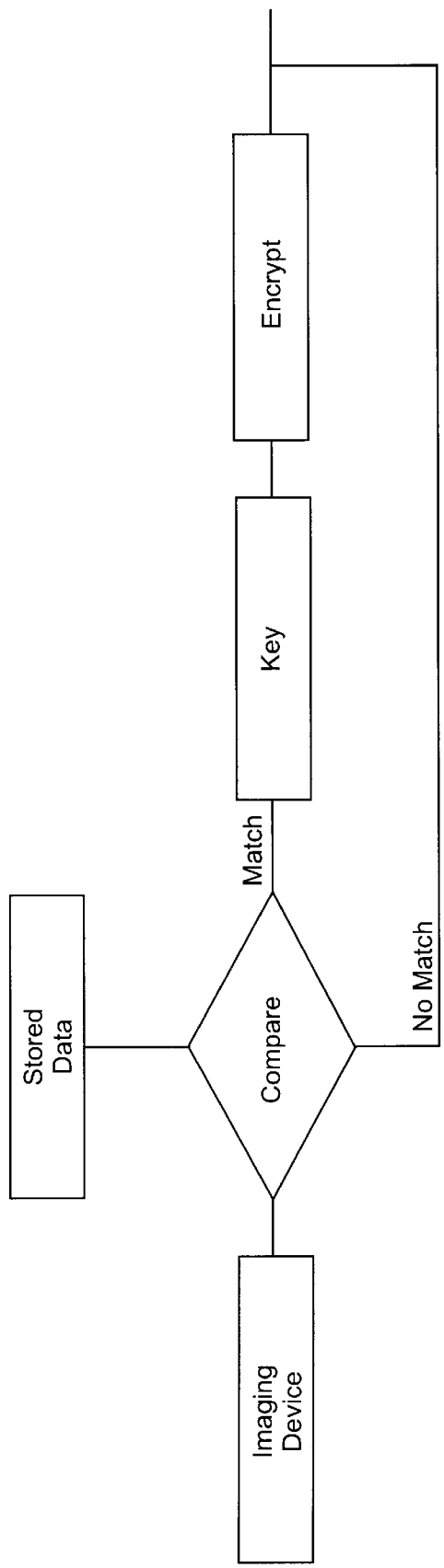
FIG. 2a is a simplified flow chart of a method according to this invention.
Figure 2B:
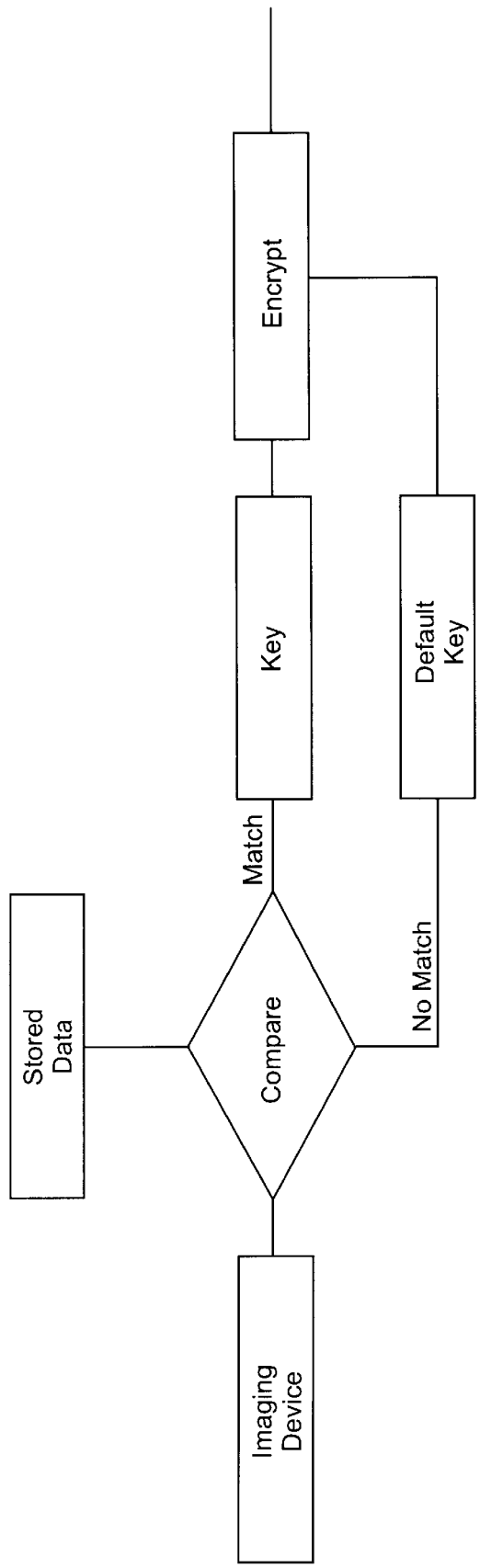
FIG. 2b is a simplified flow chart of a method according to this invention.
Figure 2C:
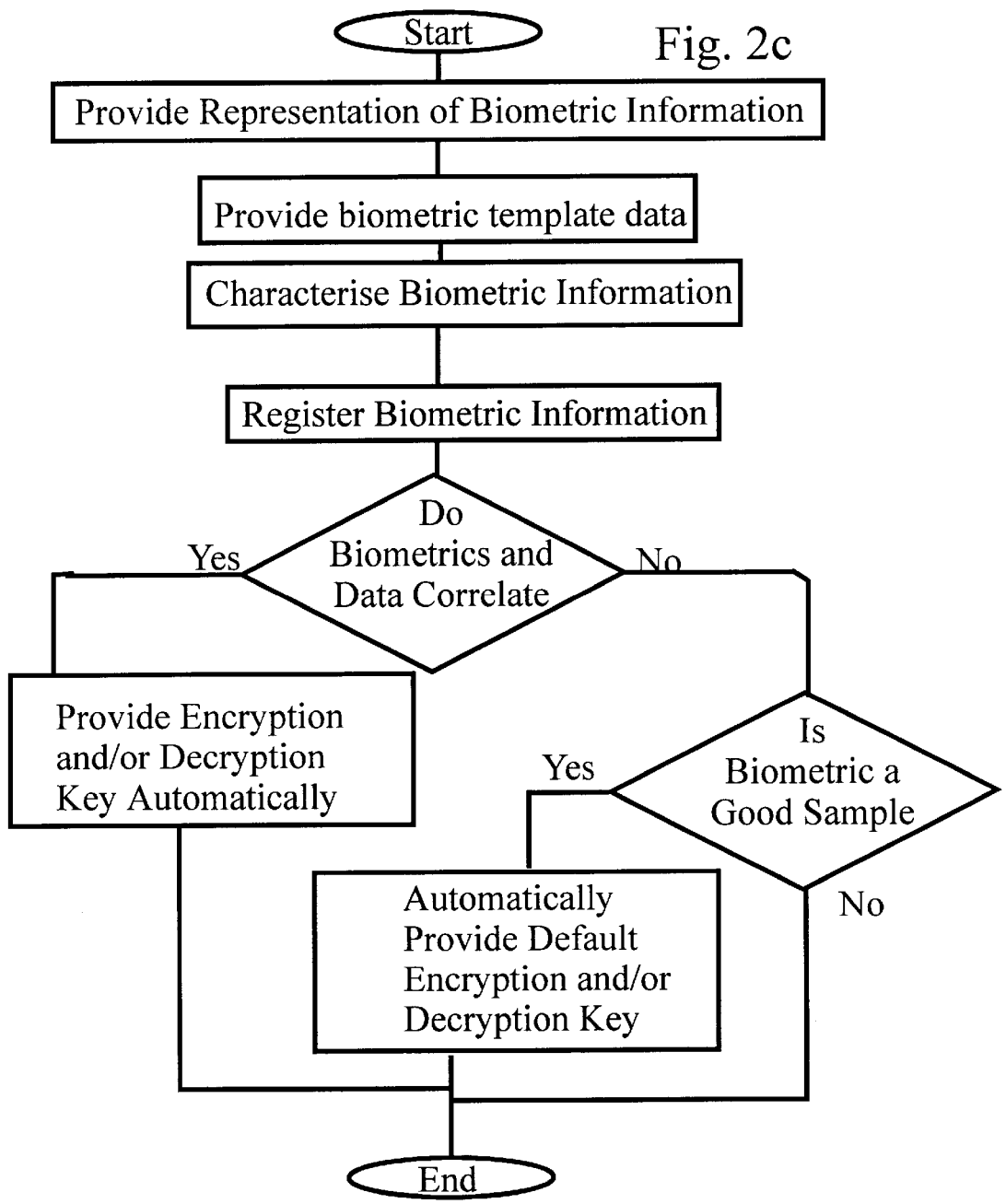
FIG. 2c is a simplified flow chart of a method according to this invention.

Referring to FIGS. 2a and 2b, a flow chart is shown outlining a method according to this invention. Stored data relating to known and authorised users and associated keys are provided. A biometric input is further provided. The biometric input and the stored data are compared to establish a match. Means of comparing biometric data in the form of fingerprints is known in the art. When a match is established, an encryption and decryption key associated with the matching data is provided to an encryption and decryption system for encrypting files for storage and for decrypting files for access. When no match is established, as shown in FIG. 2a no key is provided and the system functions absent encryption or decryption. Alternatively as shown in FIG. 2b, when no match is established, a predefined key is provided and the system functions with default encryption or decryption. In this way access to encrypted data is restricted. Of course the methods of FIGS. 2a and 2b may provide encryption keys to the encryption and decryption system in an automatic fashion. Referring to FIG. 2c, a method according to the invention is shown. Stored data relating to known and authorised users and associated keys are provided. Biometric input information is further provided. The biometric input information and the stored data are compared to establish a match. Means of comparing biometric information in the form of fingerprints is known in the art. When a match is established, an encryption and decryption key associated with the matching data is automatically provided to an encryption and decryption system for encrypting files for storage and for decrypting files for access. When no match is established, the biometric input information is evaluated. When the biometric input information exceeds a predetermined threshold, a default key is automatically provided to the computer. When the biometric information does not exceed a predetermined threshold, no key is provided. Optionally, when the biometric input information exceeds a predetermined threshold, it is stored in a retrievable location. Evaluating fingerprints to determine a quality thereof, is well known within the art.

Figure 3:
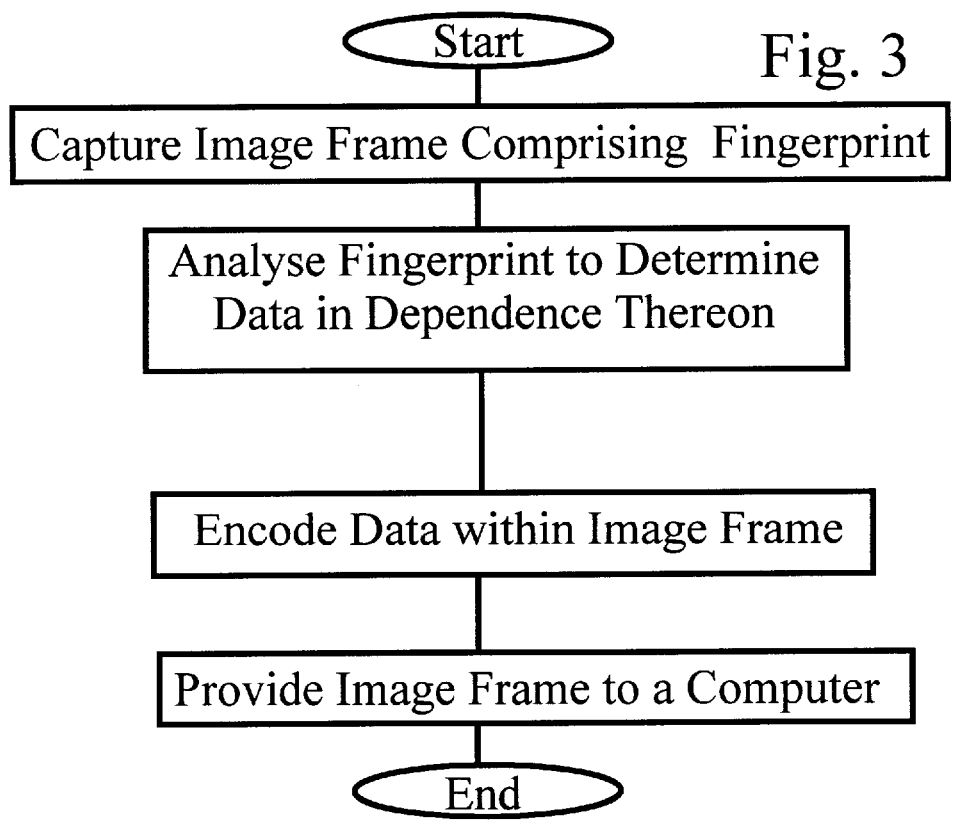
FIG. 3 is a simplified flow diagram of a method according to the invention.

Referring to FIG. 3, a flow diagram of a preferred embodiment is shown. Data selected or calculated in dependence upon biometric information is encoded within an image frame. Encoding of the data into an image frame, provides numerous advantages. The data is hidden from detection; an individual intercepting the image, will likely not known of the data's presence. Hiding the data within the image is accomplished through one of several methods. Some of these methods are outlined below. Another advantage of encoding data within an image frame is that the imaging device is available for image capture, user identification, or both; this diversity is provided through a single port on the computer and a single interface of the imaging device. Yet another advantage of encoding the data within an image frame is that the imaging system need only provide data in the form of a portion of an encryption key or a key reference and the biometric data in the form of an image; the computer then processes the image to determine another portion of the key or of the key identifier. It is apparent to those of skill in the art that key distribution increases security because signal interception provides only a portion of a key or of a key identifier.

Figure 3A:
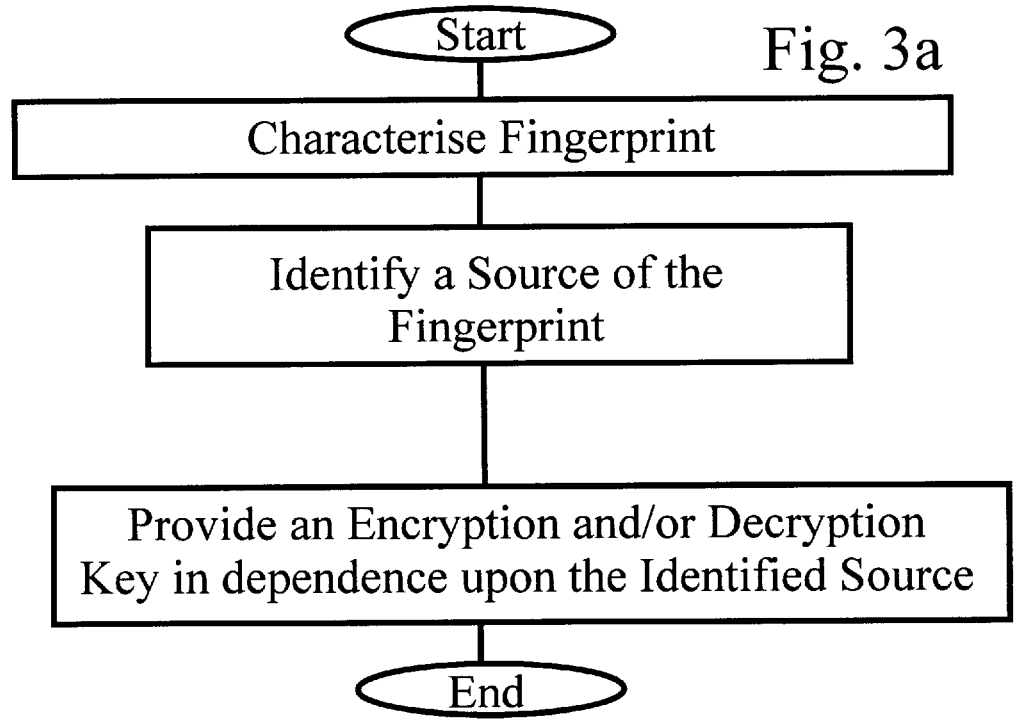
FIG. 3a is simplified flow diagram of a method of performing a step of the flow diagram according to FIG. 3.

Referring to the diagram of FIG. 3, an image capture means captures a representation of an image. The representation is in the form of a representation of an image of biometric information in the form of a fingerprint. The fingerprint is analysed to determined data in dependence thereon. For example, as shown in FIG. 3a, a fingerprint is registered in order to identify a source of the fingerprint; in dependence upon the source, an encryption and/or decryption key is selected. The key is then provided as the data. The data is then encoded within an image frame. Optionally, the image frame comprises a captured image. The image frame with the data encoded therein is transmitted to the computer.

An image frame is well known in the art of digital video processing. A video frame comprises image information in the form of pixel data. Image frames optionally comprise header information. Image frames commonly comprise a frame pulse or frame synchronisation signal; these are used to ensure that lost data does not cause video signals to be displayed incorrectly upon play back. Commonly, video image frames are transmitted at a predetermined rate. However, with digital video this is not always necessary. An image frame, as used in this specification comprises an array of pixels each having sufficient information for displaying the pixels or an image comprising the pixels. It is well known to provide 1 bit pixels for black and white images; 4 bit pixels for 16 level grey scale or 16 colour pixels; 8 bits for 256 colour or grey scale pixels; and so on.

Figure 3B:
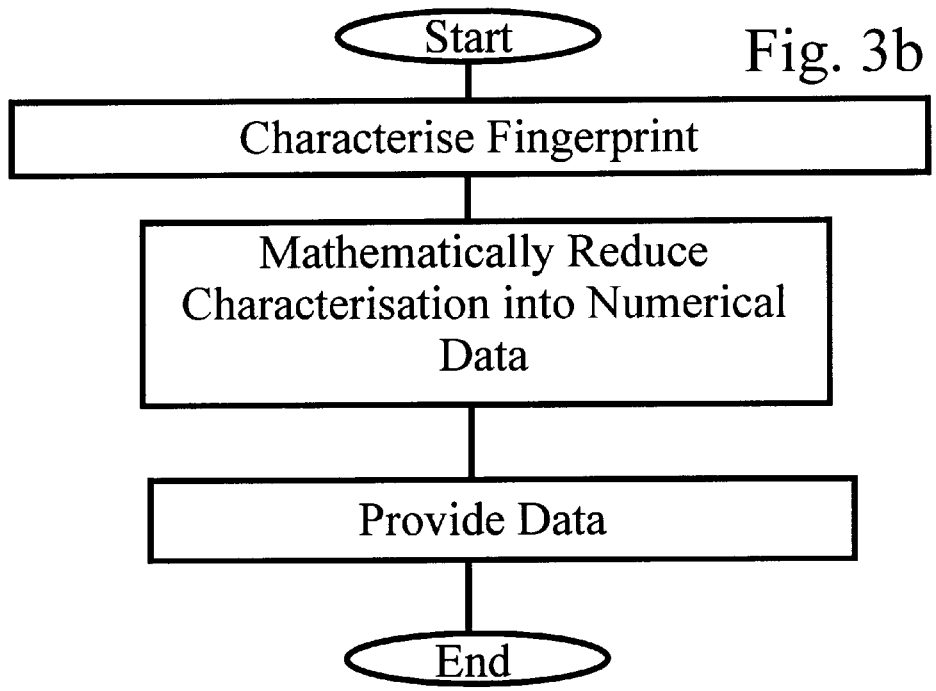
FIG. 3b is simplified flow diagram of a method of performing a step of the flow diagram according to FIG. 3.

Referring to FIG. 3b, another flow diagram of a method of analysing the biometric information to provide data is shown. The biometric information in the form of a fingerprint is characterised. The characterisation produces numerical data which is provided as the data for the method relating to FIG. 3. Optionally, the characterisation is performed in a similar fashion to current fingerprint characterisation techniques. Alternatively, an algorithm specific to this application is employed for generating data from the representation of the image.

Figure 3C:
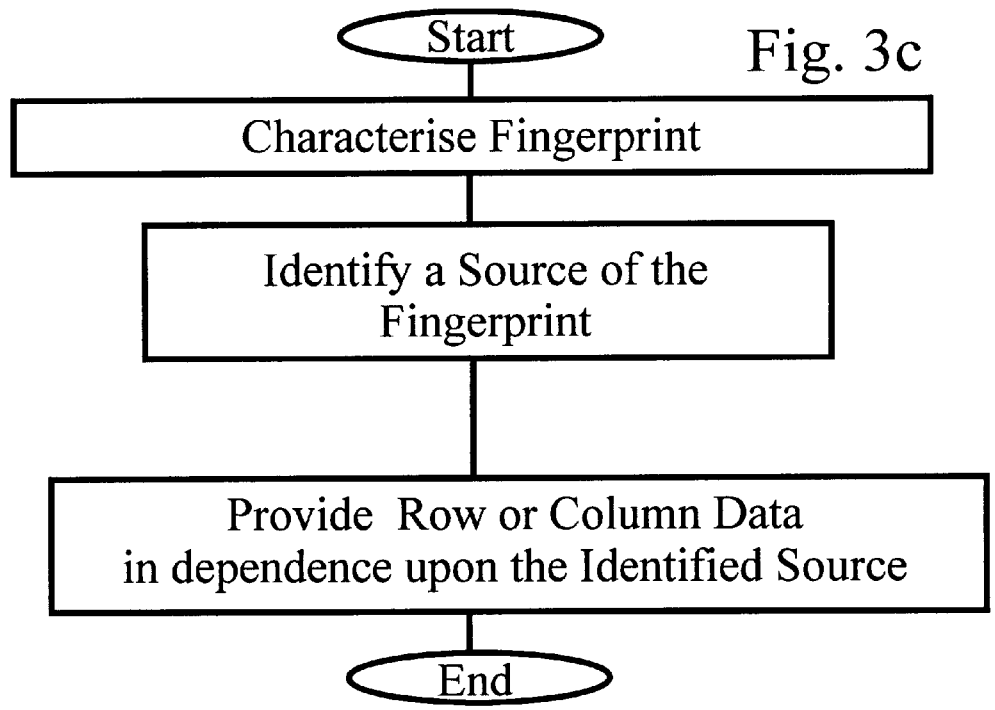
FIG. 3c is simplified flow diagram of a method of performing a step of the flow diagram according to FIG. 3.

Referring to FIG. 3c, another flow diagram of a method of analysing the biometric information to provide data is shown. The biometric information in the form of a fingerprint is registered in order to identify a source of the fingerprint; in dependence upon the source, a row or column value is determined which is provided as the data for the method of FIG. 3. The row or column information is in the form of a co-ordinate. Further processing of the image by the computer, determines a second co-ordinate allowing retrieval of an encryption key or other secure information. Alternatively, the row or column information is part of the secure information and further processing by the computer provides the remainder of the secure information.

Figure 3D:
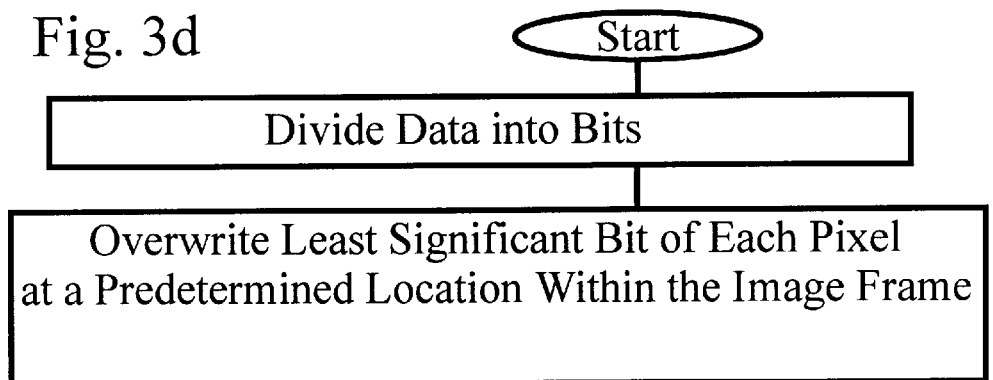
FIG. 3d is simplified flow diagram of a method of performing a step of the flow diagram according to FIG. 3.

Encoding the data within an image frame is performed according to the invention. Some examples of methods of encoding the data in the image frame are shown in FIGS. 3d, 3e, 3f, and 3g. Referring to FIG. 3d, the data is divided into groups of n bits. Preferably n is a small number in the form of 1. The groups of bits are encoded within the image frame as the lower order bits of predetermined pixels. This introduces a small quantity of noise into the image. As image capture means introduce noise into images during capture, the noise is difficult to identify as data from the imaging device. Absent appropriate software executing on the computer for extracting the encoded bits, the information is difficult to retrieve. The image frame with the encoded data is transmitted to the computer according to the method of FIG. 3.

Figure 3E:
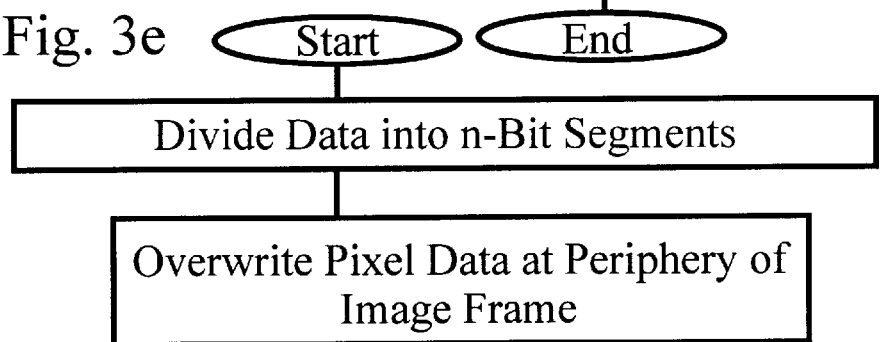
FIG. 3e is simplified flow diagram of a method of performing a step of the flow diagram according to FIG. 3.

Referring to FIG. 3e, the data is divided into n bit segments; n is a number that is determined in dependence upon predetermined pixel locations within the image frame. The n bit segments are inserted in place of n bit segments within the image frame at the predetermined pixel locations. For example, when pixels are represented by 4 bit values, a convenient value for n is 4; 4 bit segments replace pixel values for those pixels at outlying areas of an image where biometric information is not present or is unlikely to affect analysis and/or identification.

Figure 3F:
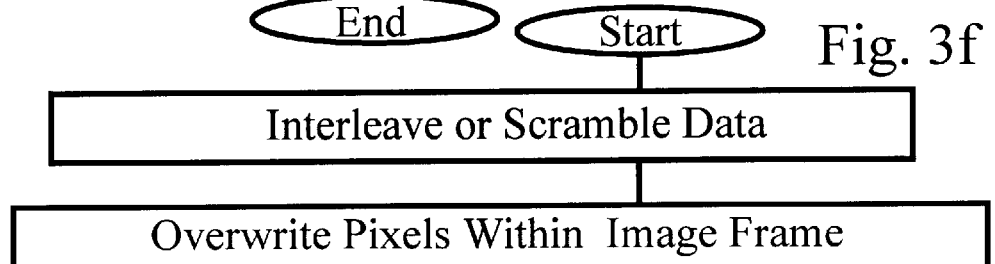
FIG. 3f is simplified flow diagram of a method of performing a step of the flow diagram according to FIG. 3.

Referring to FIG. 3f, the data is interleaved and then inserted in place of pixels at a predetermined location. This method scrambles the data and then hides it; or, alternatively, does not attempt to hide the data—inserting the data contiguously within the image frame. Alternatively, when communication interception or recording is not a concern, interleaving of the data need not be performed.

Figure 3G:
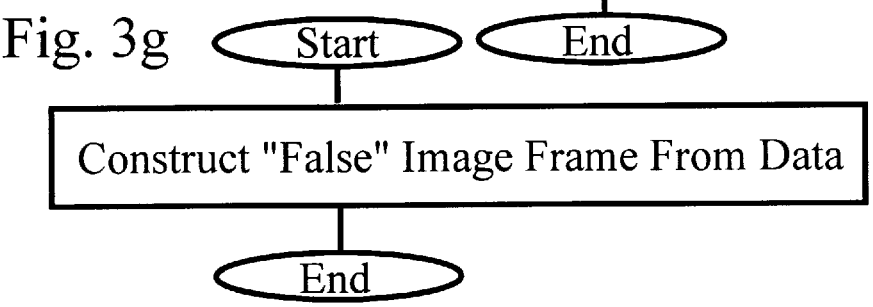
FIG. 3g is simplified flow diagram of a method of performing a step of the flow diagram according to FIG. 3.

Referring to FIG. 3g, an image frame is constructed having no captured image information therein. The image information within the image frame is associated with the provided data. Image frame synchronisation, header information, and pixel information are generated by a data encoding means. When interception of transmission is not a concern, the data is encoded within the image frame in a plain and unmodified form. Alternatively, when signal interception is likely or for enhanced security, the data is encoded within the frame in an obfuscated manner through scrambling, encryption, or another known method of secure data transfer.

Figure 4:
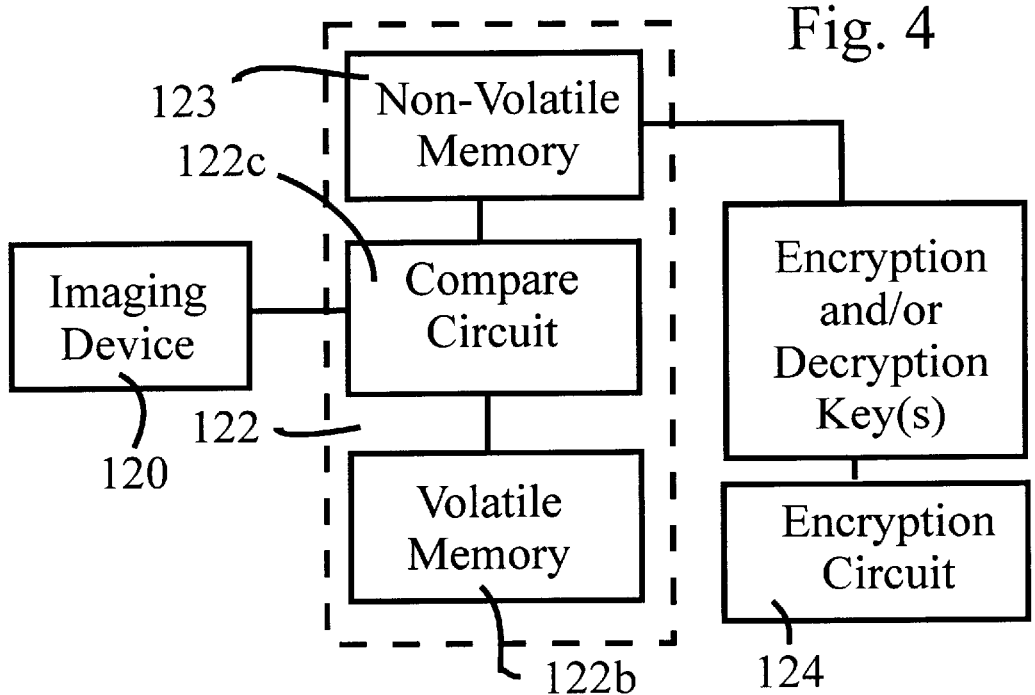
FIG. 4 is a block diagram of a device according to this invention.

Referring to FIG. 4, a block diagram of a device according to this invention is presented comprising: an imaging device 120 for accepting biometric input in the form of a fingerprint; a comparator circuit 122 comprising a comparator 122c, RAM 122b, and non-volatile memory 123 containing at least a key for use in encryption and/or decryption; and an encryption and/or decryption circuit 124.

The device is configured prior to initial use. A key is generated and stored within the non-volatile memory 123 of the device. The generated key relates to an encryption and decryption algorithm used by the encryption and decryption circuit 124 and is appropriate for such. An authorised user's biometric data is stored in non-volatile memory 123. Optionally, the non-volatile memory 123 and the non-volatile memory 123 are a same physical storage device. Preferably, the user's biometric data is sufficient for unique identification of authorised users.

In use, the imaging device 120 provides data corresponding to a fingerprint to the comparator circuit 122. The comparator circuit 122 compares the data with the biometric data previously stored in non-volatile memory 123. If a match is detected—the data is that of an authorised user— the key previously stored in non-volatile memory 123 is provided to the encryption and decryption circuit 124. The key is used by the encryption and decryption circuit 124 for encrypting files for storage and for decrypting files for access. Thus, any encrypted files are only accessible to an individual with an authorised fingerprint associated with a correct key.

Further, a plurality of keys with one or more associated authorised users' biometric data can be stored in non-volatile memory 123. In such a case, the data corresponding to the fingerprint is compared against each stored authorised user's biometric data and, when a match is found, the associated key is provided to the encryption and/or decryption circuit 124. The key is used by the encryption and/or decryption circuit 124 for encrypting files for storage and for decrypting files for access. Thus, a key is only accessible to those individuals with authorised fingerprints and an authorised individual may only be able to read some files.

Figure 4B:
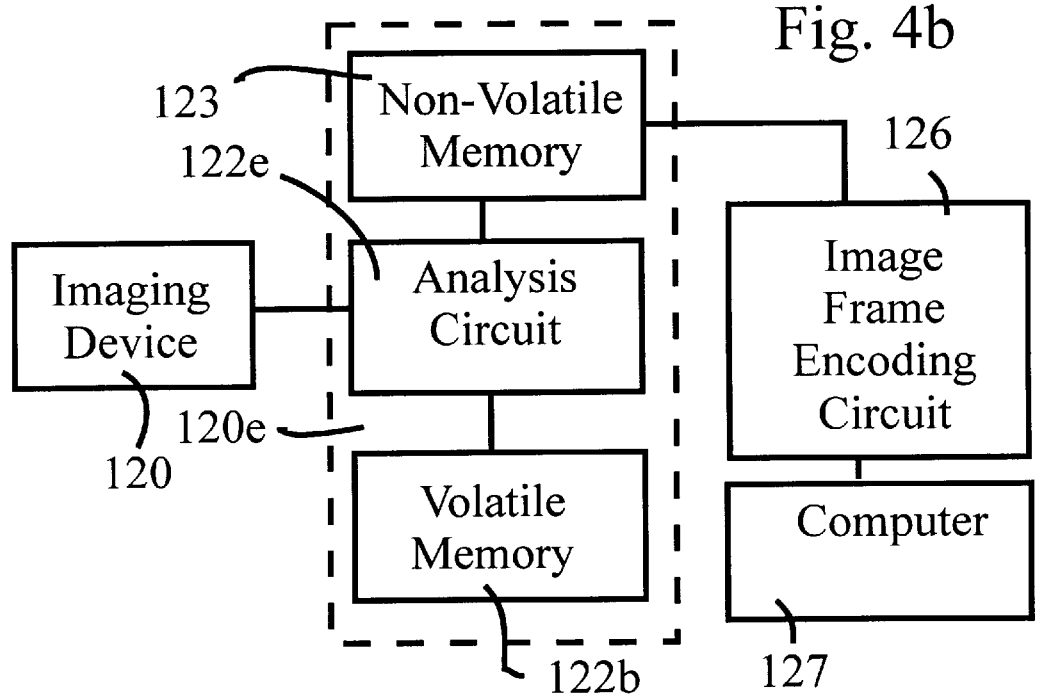
FIG. 4b is a block diagram of another device according to this invention.

Referring to FIG. 4b, in a preferred embodiment of a device according to the invention, a contact imager 120a provides a representation of an image in the form of a digital representation of an image to an analysis means 120e. The analysis means 120e comprises an analysis circuit 122e, ram 122b, and non-volatile memory 123. The analysis means 120e provides data to an image frame encoding circuit 126 for encoding the data within an image frame. Preferably, the image frame encoding circuit encodes the data within an image frame comprising a captured image. The device is shown removably coupled to a computer. In use, the device operates according to the methods set out with reference to FIG. 3.

Figure 5:
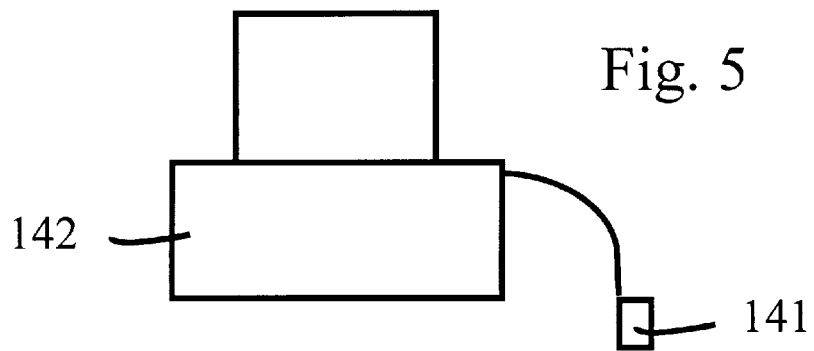
FIG. 5 is a simplified diagram of a device according to this invention comprising an imaging device connected to a personal computer.

Referring to FIG. 5 a device according to this invention comprising an imaging device 141 connected to a personal computer 142 is shown. The imaging device 141 in the form of a fingerprint scanner provides biometric data to the personal computer 142. The computer 142 has, stored in non-volatile memory in the form of a hard disk drive, data relating to at least one user. The computer 142 also has, stored in non-volatile memory, a key for use with encryption or decryption.

In use, the imaging device 141 provides data corresponding to a fingerprint to the personal computer 142. The computer 142 compares the data with the biometric data previously stored in non-volatile memory. If a match is detected—the data is that of an authorised user—the key previously stored in non-volatile memory is used with the encryption and/or decryption for reading and writing flies. Alternatively, the user may select whether or not to use the encryption prior to saving or retrieving files.

Alternatively, the imaging device further comprises a comparator and non-volatile memory for storing known authorised users and at least a key. This prevents others from searching the hard drive for the key thereby increasing security. In this embodiment, it is preferred that the imaging device be removable.

In this embodiment, it is also preferred that the key is provided automatically upon identification of an authorised user. Using automatic key provision within such a device, allows it to operate as follows: a software program in execution on the computer requires access to encrypted information or files. The program transmits a request to the user to provide biometric information to the imaging device. When biometric information is provided, identified, and corresponds to an authorised user, an associated key is provided to the computer and the program accesses the information or files. When access is completed, the program erases the key from memory. Should the user forget a portable imaging device attached to the computer, access to encrypted files remains restricted until the user provides biometric information. This additional level of security is advantageous for some applications such as network administration.

Alternatively, security is enhanced by further providing the imaging device with encryption and decryption circuitry. In use, no key is provided to the personal computer 142 and therefore, recording the key for later use is impossible. Further, the encryption algorithm chosen need not be known as the encryption and decryption are performed within the imaging device. In this embodiment, it is preferred that the imaging device be removable. Alternatively with this embodiment, provision of biometric information is required each time an encryption or decryption operation is performed.

Figure 6A:
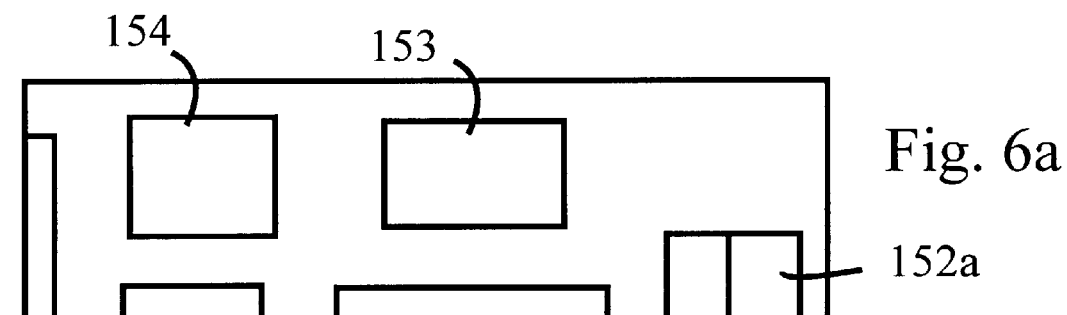
FIG. 6a is a simplified diagram of a device according to this invention contained on a PCMCIA card.
Figure 6B:
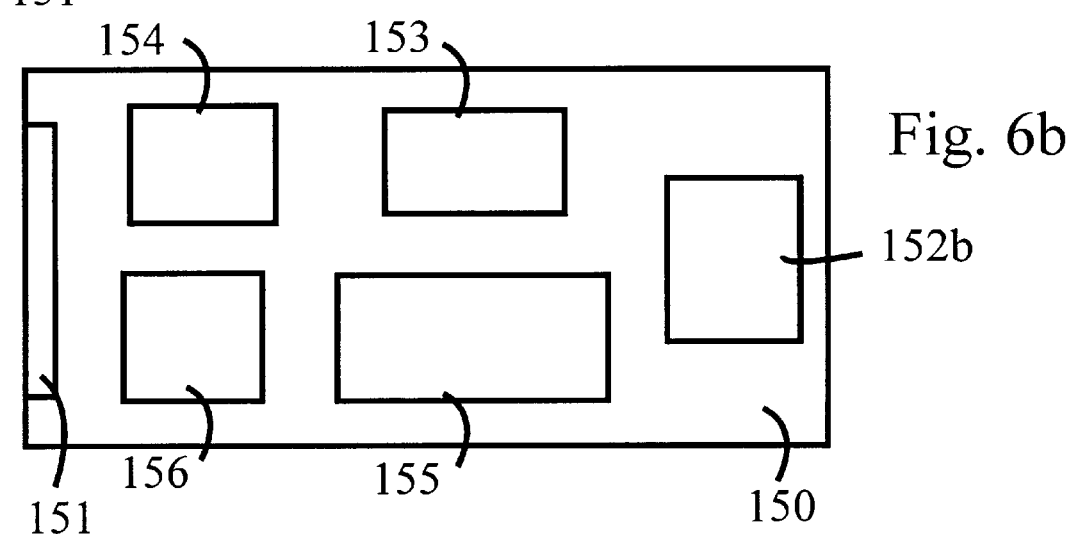
FIG. 6b is a simplified diagram of an alternative device according to this invention contained on a PCMCIA card.

Referring to FIG. 6 a device according to this invention contained on a PCMCIA card 150 is shown. The PCMCIA card further comprising a housing and a standard PCMCIA connector 151 at one end thereof. The placement of the connector 151 is defined in PCMCIA standard documents and is known in the art.

An imaging means 152 (shown as 152a and 152b) upon which a fingertip can be placed is disposed at an end opposite the connector 151. Such an imaging means 152 is in the form of an optical fingerprint imager 152a or a charge/capacitance sensing device 152b positioned anywhere such that a fingertip rests upon it comfortably while the card 150 is installed within a host computer. The card 150 further comprises comparison means 153, non-volatile memory including a key 154, encryption and decryption means 155 and PCMCIA control hardware 156.

In use, a biometric input in the form of a fingertip is placed on the imaging means 152, which senses the biometric input and provides biometric data to the comparison means 153. The comparison means comprises a comparator, RAM, and non-volatile memory containing data related to authorised users. Optionally, such comparison means contains at least a key or alternatively the non-volatile memory 154 contains the at least a key. When the key is contained in the comparison means, the non-volatile memory 154 is unnecessary. Each authorised user is associated with at least a key such that when the comparison means detects a match, at least a key associated with the authorised user is provided to the encryption and/or decryption means 155. The encryption and/or decryption means operates to encrypt data to be stored and/or to decrypt data to be accessed.

When multiple keys are used with an authorised user, it is preferable that each file be stored with an encrypted header. Such a header acts as verification that the file was decrypted correctly (with the correct key) and can be stripped during file access. As such, the encryption and decryption means can decrypt a file using each available key and only provide a user with intelligible decrypted files by verifying that the header is as anticipated.

In a further embodiment, the device housed within a PCMCIA card further comprises means for encoding data within an image frame and a transmission means for transmitting the image frame to the computer. Alternatively, the connector and the comparator co-operate to form the transmitting means. Further alternatively, the encryption and/or decryption means is not housed on the PCMCI card. Of course, variations such as the circuit of FIG. 4b may be included within a PCMCIA card according to the invention.

Referring to FIG. 7a, another method according to the invention is shown. An image frame comprising a digital representation of an image is captured and provided to a processor. The processor analyses the frame to determine a presence of biometric information. When no biometric information is detected, the image frame is transferred to the computer. This allows for use of the image capture means as a video camera or for video conferencing. Preferably, the image capture means is operable in a plurality of modes comprising a video mode and a biometric image capture mode. When biometric image information is detected, the information is analysed to determine data. The data is provided to a data encoding circuit and is encoded within an image frame. The image frame is then provided to the computer with the encoded data therein and another image is captured.

Figure 7B:
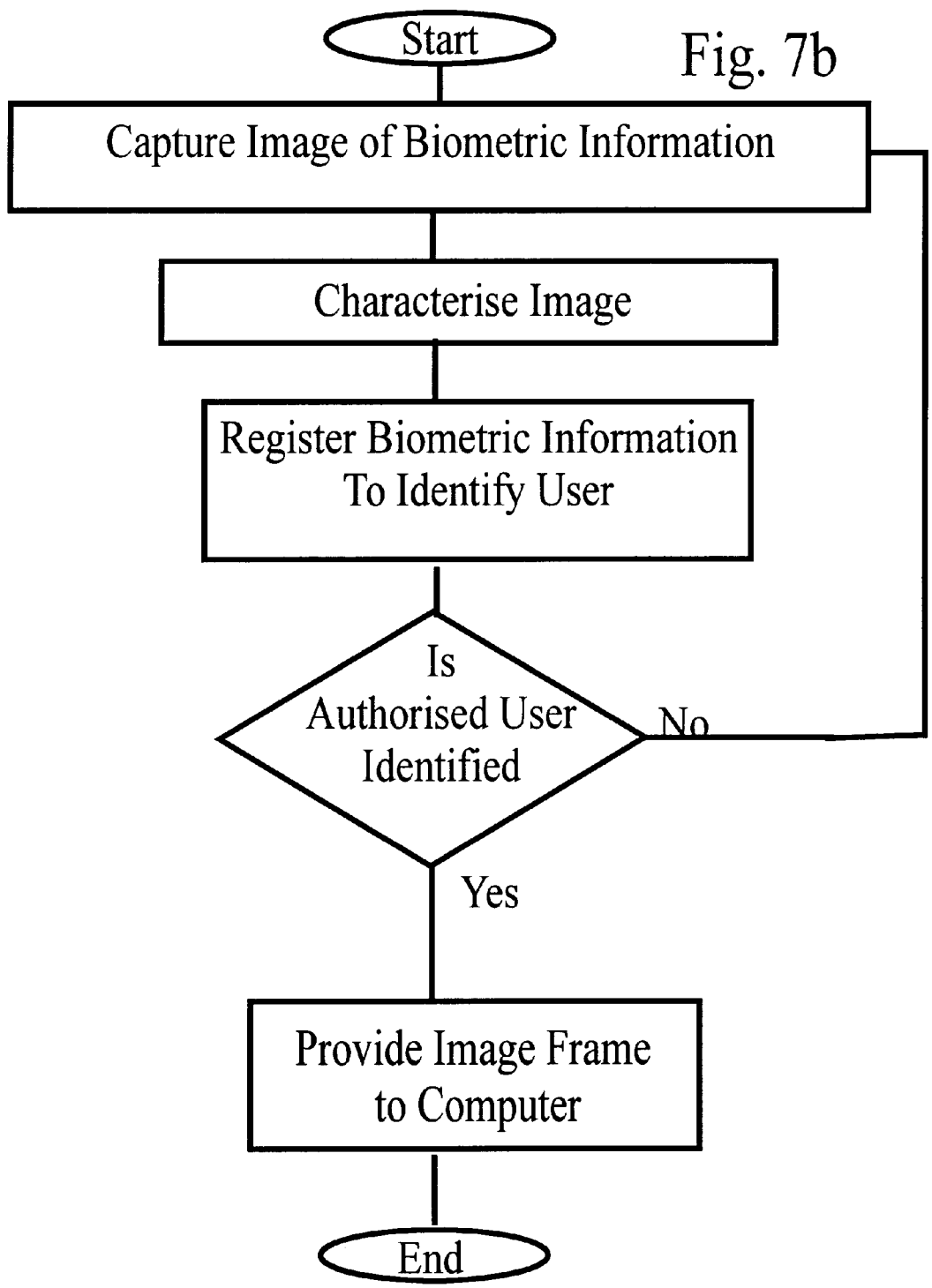
FIG. 7b is another simplified flow diagram of a method according to the invention.

Referring to FIG. 7b, another method according to the invention is shown. An image frame comprising a digital representation of an image is captured and provided to a processor. The processor analyses the frame to determine a presence of biometric information. When biometric information is detected, the biometric information is registered against stored templates associated with biometric information of known users to identify the source of the biometric information. When the source is identified as an authorised source, the image frame is provided to the computer. Advantageously, this reduces the usefulness of a portable contact imaging device for non-authorised users and thereby acts as a theft deterrent.

Alternatively, encryption circuitry is provided in the imaging device for encrypting and/or decrypting data; and an encryption key is provided to the computer in dependence upon the biometric input information.

Providing data in the form of an encryption and/or decryption key encoded within an image frame limits a number of encryption and/or decryption keys provided by an imaging device in a period of time. This, advantageously, prevents record and replay attacks from efficient execution. Due to the inherently slow nature of providing biometric information, users are unlikely to experience any reduction in performance or other limitations due to this data latency.

In an embodiment, the data is encoded within a plurality of different image frames. Such an application distributes the data among frames for increased security or another purpose.

A biometric input device according to the present invention is designed to be used with a computer in the form of a personal computer. The input device is self contained and adapted to interface to one of several industry standard or proprietary computer peripheral connectors.

Figure 8:
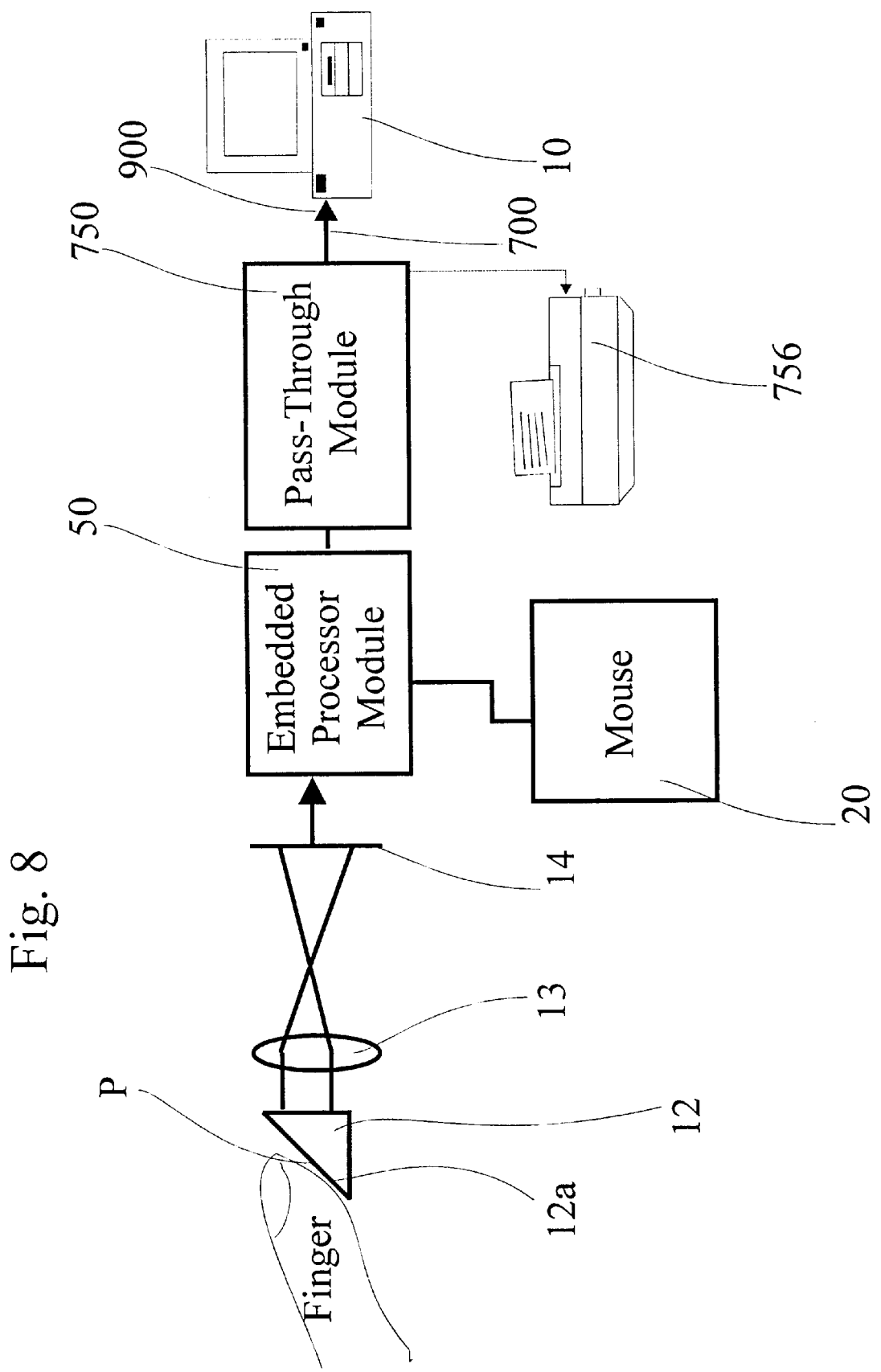
FIG. 8 is a simplified block diagram of a system according to the invention.

Referring to FIG. 8, a simplified block diagram of a biometric imaging device with a parallel pass through is shown. The imaging means comprises a prism 12 having a surface 12a for contacting a fingertip, a lens 13, and a CCD array 14 for imaging incident light. A processor 50 converts an analogue signal provided by the CCD 14 to a digital signal. A pointing device in the form of a mouse 20 housed within a same housing as the optical imaging means provides a signal in dependence upon relative position of the mouse to the processor module 50. Pointing devices are well known in the art. The processor module 50 provides a signal in dependence upon the relative position information and the digital signal to a pass through module 750. The signal is a combination of the digital signal and the position information formed by multiplexing the information into a third signal. Alternatively, the third signal is formed by encoding the digital signal with position information in a predetermined fashion. The pass through module 750 is connected to a peripheral port on a computer 10 via a communication means in the form of a cable 700 and allows further digital devices to be connected via the pass through module 750 to the same port. A printer 756 is shown connected to the computer via the pass through port 750. The use of a single port for multiple devices is desirable as it increases flexibility and expandability of computer systems. Alternatively, a pass through port is not used and the apparatus according to the invention occupies a single port on the computer 10.

Figure 9:
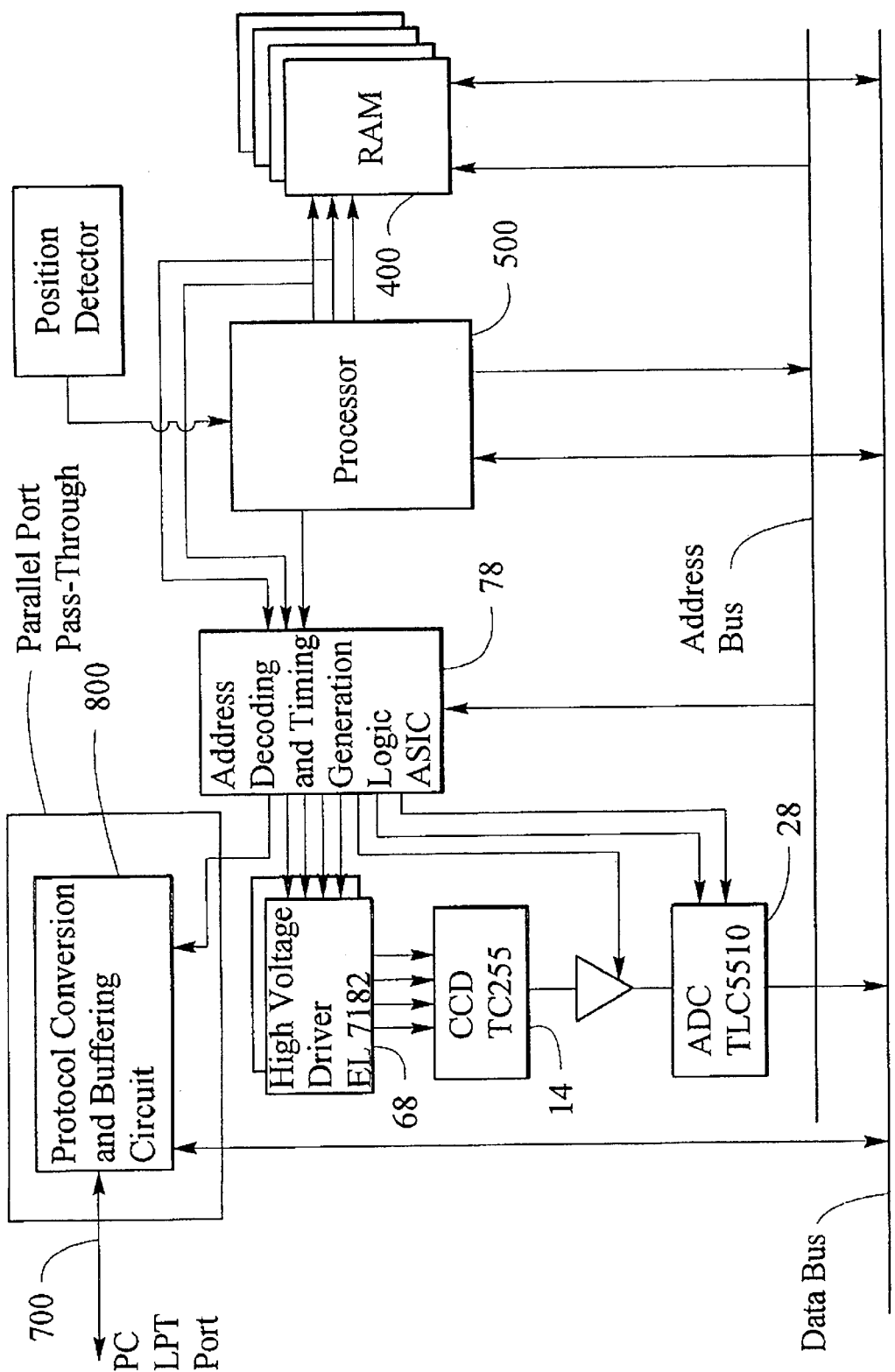
FIG. 9 is a simplified schematic diagram of a system according to the invention; and, FIG. 10 is a simplified schematic diagram of a system according to the invention incorporating a parallel pass through port.

Referring to FIG. 9, a detailed block diagram of an embodiment of the invention is shown. A CCD 14 is used to capture an optical image in the form of a fingerprint image. The CCD 14 is driven by a high voltage driver circuit 68. Address and decoding circuitry 78 provides control signals to the high voltage driver and acts to gate image information output from the CCD 14 through an analogue to digital converter 28 and onto a data bus. The address decoding circuit 78 is driven by a processor 500 in the form of a microcontroller and is connected to an address bus. The micro-controller operations are performed in accordance with a predetermined instruction set stored in RAM 400. Alternatively the instruction set is stored in ROM (not shown). A buffering and protocol conversion circuit 800 allows information from the data bus to be output directly to a parallel or serial digital input port present in a computer. One such input port is a parallel port. Different buffering and protocol conversion circuits are used with different digital ports.

Alternatively, the buffering and protocol conversion circuit 800 is a pass through serial port circuit. Such a circuit allows the connection of a plurality of devices to a single computer peripheral port. The circuit operates to allow other peripherals connected to the port to operate normally while the image capture device is not in use. During use, however, the image capture device assumes control of the port and prevents normal operation of other peripheral devices.

Figure 10:
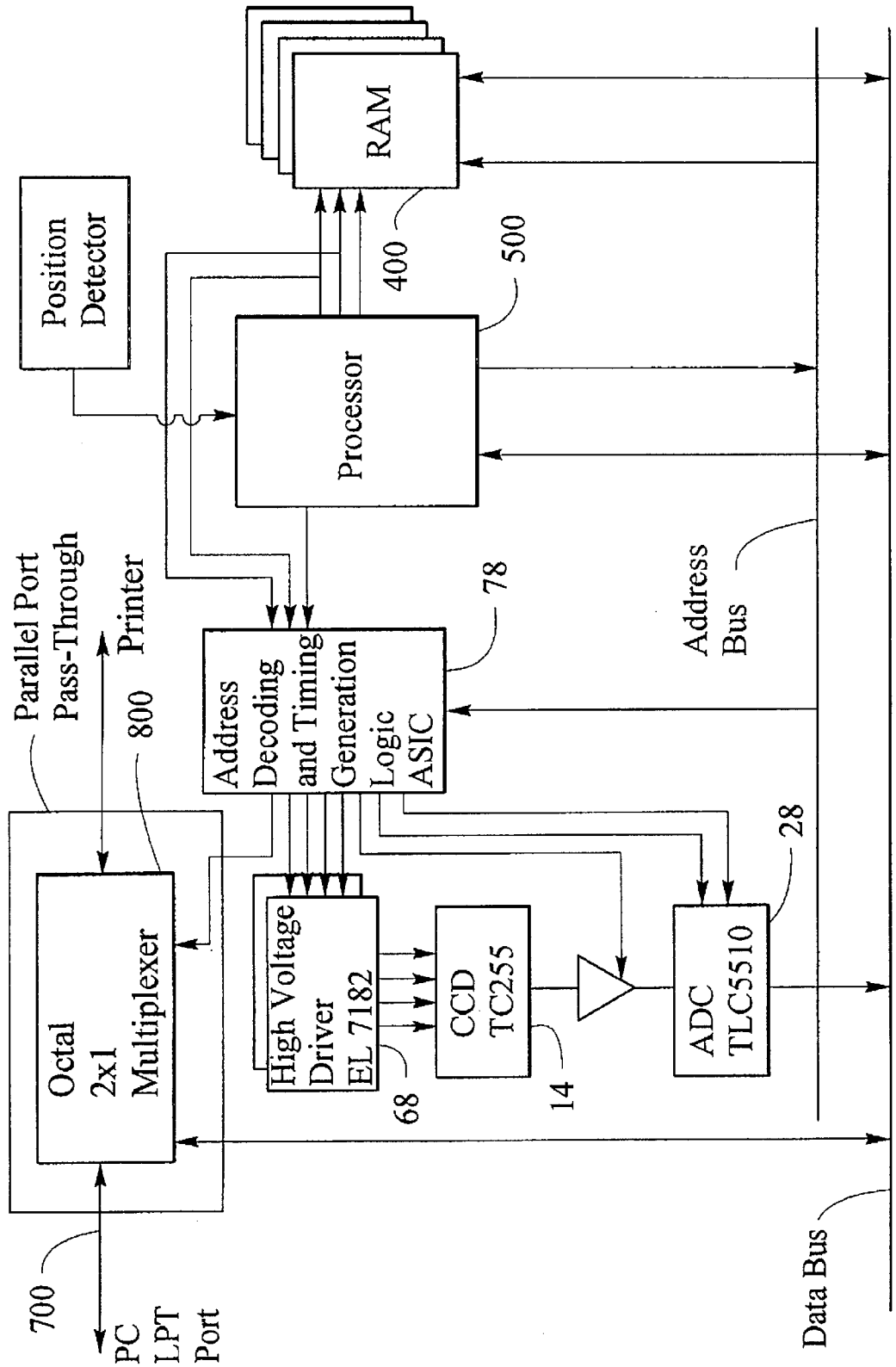

Referring to FIG. 10, the buffering and protocol conversion circuit 800 comprises a parallel pass through circuit. The circuit comprises 2×1 multiplexers 803 for allowing processor controlled switching of a peripheral port data bus 810 to other peripheral devices (and therefrom) or to a biometric imaging device according to the present invention. The addition of a buffer (implemented using processor control logic and the RAM) allows for the biometric imaging device to buffer signals from other devices while transferring information in the form of imaging information to the peripheral port data bus. Alternatively, the pass through buffers imaging information. Further, by monitoring control signals from the peripheral port in an unswitched fashion, the device is capable of receiving control information while other peripherals are in use. This form of monitoring requires multiplexers for a peripheral port data bus 810 carrying information to the peripheral port from peripheral devices and does not require multiplexers for a peripheral data bus carrying information to the peripheral devices from peripheral port. Optionally, buffers are used for information to the peripheral devices from peripheral port in order to increase distance and quantity of peripheral devices connected to a single peripheral port.

Use of microcontroller 500 allows for changing of the predetermined port to one with a different connector or configuration with only minor modifications such as changing the programming stored in non-volatile memory. Also, the encoding of the data is alterable with similar modifications. Alternatively, the means 50 comprises dedicated circuitry for transmitting the encoded image frame in a digital form.

The carrier means 700 is in the form of a cable, radio transmission, or infrared transmission. Such carriers are known in the art. When a non-physical carrier such as radio or infrared emissions is used, a suitable receiver is required connected to or integrated with the computer. Such a configuration enhances portability by requiring no physical connection to the imaging device; however, where the suitable receiver is not a common feature of installed computers, a receiver would then be necessary for every computer with which the imaging device may be used.

The connection means 900 is selected to mate with a connector on a computer with which the imaging device is to be used. It is anticipated that such a connector mates with industry standard ports for parallel or serial communications. Some examples of ports include Geoport®, Apple Desktop Bus®, parallel port, RS232 port, IRDA, game port and universal serial bus port. Portability is enhanced when the port is accessible when the computer is installed and in use.

Alternatively, the micro-controller circuitry is designed so the programming is provided after power up via a predetermined port on a computer 10. Programming in this fashion is performed by a host computer executing software designed to program the micro-controller 50 via the predetermined port on the computer 10. The design of micro-controller circuits that are programmed from remote processors or host computers is known; however, unlike the present invention, such designs often limit the use of the micro-controller circuit to a specific predetermined interface such as a standard PC parallel port or an RS232 port.

In use, the imaging device is coupled to a computer. The computer is turned on and the device is powered from the computer's power source. Alternatively, the device may be provided with a separate power source. The micro-controller within the device is programmed and begins analysing digital images provided by the analogue to digital conversion circuitry means for a representation of a fingerprint. While no fingerprint is detected, no image frames are transmitted to the computer. Alternatively, image frames having no encoded data therein are transmitted to the computer at intervals. When a fingerprint image is detected, the fingerprint is analysed to provide data. The data is encoded into the image data by replacing unused pixels, adding extra data at intervals, or another data encoding scheme.

Software executing within the computer may use the image frames as a data input signal for user authorisation, or for another purpose. Preferably, when used for user or task authorisation such as root level access to a computer network, such a device is designed for portability and is easy to install and remove from the computer.

Typically, CCDs (charge coupled device arrays) for use with this device require 0.25 seconds to transfer an analogue electronic image to the analogue to digital conversion circuitry means. The first 0.25 seconds wherein a finger print is detected by the micro-controller (as well as the last 0.25 seconds) may result in a poor quality digital image where the finger tip was moving and was only present on the device for a small portion of the 0.25 seconds. Further, fingertip positioning changes during contact which results in different digital images of a single fingertip. To overcome this problem, a time series averaging technique is applied to each of the digital image frames provided to the micro-controller in order to build a composite image frame of the fingerprint that will be better quality than any one print image on its own. Time series averaging is known in the art of digital image processing. Alternatively, the micro-controller can select a digital image frame based on a predetermined selection criterion.

Numerous other embodiments may be envisaged without departing from the spirit and scope of the invention.

What is claimed is:

1. A method of providing data, in dependence upon a fingerprint, to a computer, comprisiing the steps of:
   providing a fingerprint to an imaging device for providing a digital representation of an image of the fingerprint;
   using a processor in communication with the imaging device other than a processor of the computer, processing the digital representation of the image of the fingerprint to provide processed data including at least one of data derived from the image of the fingerprint and data retrieved from memory determined in dependence upon the step of processing the digital representation of the fingerprint;
   securing the data prior to transmission from the imaging device to the computer by the step of: replacing some of the digital representation of the image of the fingerprint with the processed data, the processed data replacing a non-zero portion less than the whole of the digital representation of the image of the fingerprint;
   transmitting from the imaging device to the computer a video signal comprising the digital representation of the image of the fingerprint including the encoded data therewithin;
   receiving the video data signal at the computer; and,
   using the processor of the computer, processing the received video data signal to extract the processed data within one or more fingerprint images, the extracted processed data for use in one of authorising access to the computer and securing of data.

2. A method of providing data, in dependence upon a fingerprint, to a computer as defined in claim 1 wherein the data is encoded replacing the least significant bit of known data bytes within the digital representation of the image of the fingerprint.

3. A method of providing data, in dependence upon a fingerprint, to a computer, as defined in claim 1 wherein the processed data comprises a portion of an encryption or decryption key and wherein the step of processing the received video data signal to extract the processed data comprises the step of forming the encryption or decryption key using the data.

4. A method of providing data, in dependence upon a fingerprint, to a computer, as defined in claim 3 wherein the processed data comprises a complete encryption and/or decryption key.

5. A method of providing data, in dependence upon a fingerprint, to a computer, as defined in claim 1 comprising the step of transmitting a plurality of image frames to the computer in succession.

6. A method of providing data, in dependence upon a fingerprint, to a computer, as defined in claim 5 wherein the step of; transmitting a plurality of image frames to the computer is performed at known intervals.

7. A method of providing data, in dependence upon a fingerprint, to a computer, as defined in claim 6 comprising the step of: transmitting image frames absent processed data to the computer at known intervals when an absence of a fingerprint is detected within a digital representation of an image captured by the imagine device.

8. A method of providing data, in dependence upon a fingerprint, to a computer, as defined in claim 1 comprising the step of capturing a digital representation of the fingerprint using a contact imager.

9. A fingerprint sensing system for providing data in dependence upon a fingerprint to a computer comprising:
   an imaging device for capturing a fingerprint image;
   means for processing the fingerprint image to provide asscociated data comprising other than image data of a fingerprint, the data for use in one of user authorisation by the computer and securing data by the computer;
   means for securing the associated data prior to transmission by the step of: replacing some of the image of the fingerprint captured by the imaging device with the associated data, the associated data replacing a non-zero portion less than the whole of the image of the fingerprint; and, means for providing the video data signal comprising the fingerprint image including the associated data to the computer.

10. A fingerprint sensing system for use with a computer as defined in claim 9 wherein the associated data comprises an encryption and/or decryption key; and, wherein the means for processing the image to provide associated data comprises: electronic non-volatile storage means for storing at least some fingerprint data and at least an encryption and/or decryption key;

means for characterising the captured fingerprint image and for comparing the characterised captured fingerprint image with the stored fingerprint data; means for providing the encryption and/or decryption key as the associated data in dependence upon the comparison.

11. A fingerprint sensing system for use with a computer as defined in claim 9 wherein the video signal is a digital video signal.

12. A fingerprint sensing system for use with a computer as defined in claim 9 wherein the fingerprint sensing system is removable from the computer.

13. A fingerprint sensing system for use with a computer as defined in claim 9 further comprising encryption and decryption means.

14. A fingerprint sensing system for use with a computer comprising:

an imaging device for capturing a fingerprint image;

electronic non-volatile storage means for storing fingerprint data relating to each of at least one authorised user and for storing security data in association with the at least one authorised user, the security data comprising at least one of an access code, all encryption key and a decryption key;

a processor for comparing data provided by the imaging device and the stored fingerprint data relating to each of at least one authorised user, for providing the security data associated with the authorised user and for securing the security data prior to transmission to the computer by the step of: replacing some of the fingerprint image captured by the imaging device with the security data, the security data replacing a non-zero portion less than the whole of the fingerprint image, the fingerprint image forming part of a video data signal;

output means for providing the video data signal including at least an image frame comprising the fingerprint image and security data to the computer wherein provision of said video data signal is dependent upon detection of an authorised user.

* * * * *

UNITED STATES PATENT AND TRADEMARK OFFICE
CERTIFICATE OF CORRECTION

PATENT NO. : 5,995,630
DATED : November 30, 1999
INVENTOR(S) : Borza

It is certified that error appears in the above-identified patent and that said Letters Patent is hereby corrected as shown below:

At column Column 13 line 60 please replace "comprisiing" with --comprising--

At column 16 line 6 please replace "all" with --an--

Signed and Sealed this

First Day of August, 2000

*Attest:*

Q. TODD DICKINSON

*Attesting Officer*     *Director of Patents and Trademarks*